(12) United States Patent
Ikeda et al.

(10) Patent No.: US 8,780,273 B2
(45) Date of Patent: Jul. 15, 2014

(54) SIGNAL PROCESSING APPARATUS, SIGNAL PROCESSING METHOD, AND PROGRAM

(75) Inventors: Kiyoshi Ikeda, Kanagawa (JP);
Toshimichi Hamada, Tokyo (JP); Yoichi Hirota, Kanagawa (JP)

(73) Assignee: Sony Corporation (JP)

( * ) Notice: Subject to any disclaimer, the term of this patent is extended or adjusted under 35 U.S.C. 154(b) by 70 days.

(21) Appl. No.: 13/210,629

(22) Filed: Aug. 16, 2011

(65) Prior Publication Data

US 2012/0050618 A1 Mar. 1, 2012

(30) Foreign Application Priority Data

Aug. 24, 2010 (JP) ................................ P2010-187372

(51) Int. Cl.
*H04N 5/202* (2006.01)
*H04N 9/69* (2006.01)
*G03F 3/08* (2006.01)

(52) U.S. Cl.
USPC ............................ 348/674; 348/675; 358/519

(58) Field of Classification Search
USPC ............ 348/254, 674–675; 358/519; 345/591
See application file for complete search history.

(56) References Cited

U.S. PATENT DOCUMENTS

| | | | | |
|---|---|---|---|---|
| 5,296,920 | A * | 3/1994 | Sakaue et al. | 348/675 |
| 5,345,265 | A * | 9/1994 | Kim | 348/254 |
| 5,661,575 | A * | 8/1997 | Yamashita et al. | 358/519 |
| 6,101,271 | A * | 8/2000 | Yamashita et al. | 382/167 |
| 6,654,028 | B1 | 11/2003 | Yamakawa | |
| 6,950,551 | B2 * | 9/2005 | Murashita et al. | 382/166 |
| 2002/0033830 | A1 | 3/2002 | Yamakawa | |
| 2004/0246537 | A1 * | 12/2004 | Ohyama et al. | 358/479 |
| 2004/0263637 | A1 * | 12/2004 | Serizawa et al. | 348/222.1 |
| 2006/0061842 | A1 * | 3/2006 | Oka et al. | 358/522 |
| 2007/0024759 | A1 * | 2/2007 | Miyazawa | 348/675 |
| 2007/0103551 | A1 * | 5/2007 | Kim et al. | 348/180 |
| 2010/0142847 | A1 * | 6/2010 | Moon et al. | 382/274 |
| 2010/0157112 | A1 * | 6/2010 | Miyagi | 348/242 |
| 2010/0303352 | A1 * | 12/2010 | Nobuoka | 382/167 |
| 2010/0329553 | A1 * | 12/2010 | Shiokawa et al. | 382/167 |
| 2011/0299773 | A1 * | 12/2011 | Monobe et al. | 382/167 |
| 2012/0013649 | A1 * | 1/2012 | Higashi et al. | 345/690 |
| 2012/0200589 | A1 * | 8/2012 | Min et al. | 345/591 |

FOREIGN PATENT DOCUMENTS

JP 11-327496 A 11/1999

* cited by examiner

*Primary Examiner* — Brian Yenke
(74) *Attorney, Agent, or Firm* — Lerner, David, Littenberg, Krumholz & Mentlik, LLP (57) ABSTRACT

There is a signal processing apparatus, including a gamma correction circuit that performs gamma correction on an input luminance signal and generates an output luminance signal, an output-to-input ratio calculation circuit that calculates a ratio of the output luminance signal to the input luminance signal as an output-to-input ratio of a luminance signal, and a color difference correction circuit that multiplies an input color difference signal by the output-to-input ratio of the luminance signal and generates an output color difference signal. As a result, by correcting the input color difference signal using the output-to-input ratio of the luminance signal, the output color difference signal in which color difference correction has been performed in view of influence of gamma correction can be generated.

8 Claims, 8 Drawing Sheets

SIGNAL PROCESSING APPARATUS, SIGNAL PROCESSING METHOD, AND PROGRAM

CROSS-REFERENCE TO RELATED APPLICATION

The present application claims priority from Japanese Patent Application No. JP 2010-187372 filed in the Japanese Patent Office on Aug. 24, 2010, the entire content of which is incorporated herein by reference.

BACKGROUND

The present disclosure relates to a signal processing apparatus, a signal processing method, and a program.

In a digital input/output (I/O) device, gamma correction is generally performed to adjust the brightness of an image. In gamma correction, color signals of three primary colors R, G, and B representing colors of pixels are corrected, but only a luminance signal representing the brightness of a pixel may be corrected in terms of processing efficiency. For example, Japanese Patent Application Laid-Open (JP-A) No. 11-327496 discloses a signal processing apparatus that corrects only the luminance signal

SUMMARY

In gamma correction, a characteristic curve expressed as a free curve may be used so as to emphasize a black color in an image. If the color signals are corrected, a relatively high processing load is necessary, but an image having an emphasized black color can be appropriately displayed. However, if only a luminance signal is corrected, a processing load is reduced, but an image may deteriorate, for example, a flesh color in an image may look reddish.

In light of the foregoing, it is desirable to provide a signal processing apparatus, a signal processing method, and a program which are capable of suppressing deterioration of a gamma-corrected image.

According to an embodiment of the present disclosure, there is a signal processing apparatus, including a gamma correction circuit that performs gamma correction on an input luminance signal and generates an output luminance signal, an output-to-input ratio calculation circuit that calculates a ratio of the output luminance signal to the input luminance signal as an output-to-input ratio of a luminance signal, and a color difference correction circuit that multiplies an input color difference signal by the output-to-input ratio of the luminance signal and generates an output color difference signal.

Further, the color difference correction circuit may revise the output-to-input ratio of the luminance signal in response to the input color difference signal, multiplies the input color difference signal by the revised output-to-input ratio of the luminance signal, and generates the output color difference signal.

Further, the output-to-input ratio of the luminance signal may be revised so that influence of color difference correction increases as an absolute value of a color difference value represented by the input color difference signal decreases.

Further, the output-to-input ratio calculation circuit may calculate the output-to-input ratio of the luminance signal, without performing a division operation, using a calculation table specifying a relationship between an input value of the luminance signal and a ratio of an output value to the input value of the luminance signal.

Further, the gamma correction circuit may calculate an output value of the luminance signal, without performing a division operation, using a calculation table specifying a relationship between an input value of the luminance signal and a ratio of the output value of the luminance signal.

According to another embodiment of the present disclosure, there is provided a signal processing method, including performing gamma correction on an input luminance signal and generating an output luminance signal, calculating a ratio of the output luminance signal to the input luminance signal as an output-to-input ratio of a luminance signal, and multiplying an input color difference signal by the output-to-input ratio of the luminance signal and generating an output color difference signal.

According to another embodiment of the present disclosure, there is provided a program causing a computer to execute the signal processing method. The program may be provided using a computer readable recording medium or may be provided through a communication means.

According to the embodiments of the present disclosure described above, a signal processing apparatus, a signal processing method, and a program which are capable of suppressing deterioration of a gamma-corrected image can be provided.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[1. Configuration of Signal Processing Apparatus 1]

Figure 1:
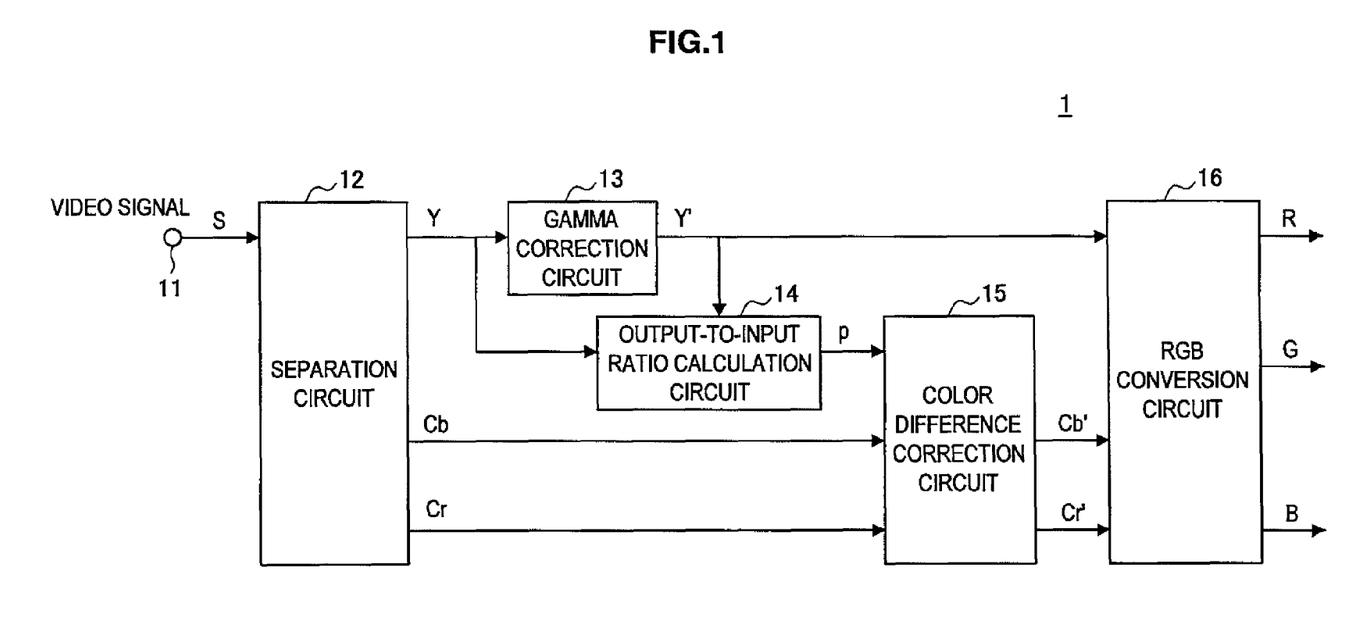
FIG. 1 is a block diagram illustrating a main configuration of a signal processing apparatus according to an embodiment of the present disclosure.

First, the configuration of the signal processing apparatus 1 according to an embodiment of the present disclosure will be described with reference to FIG. 1. FIG. 1 illustrates the main configuration of the signal processing apparatus 1.

The signal processing apparatus 1 is applied to an apparatus, which performs gamma correction on an image signal or a video signal, such as a display device, an image recording/reproducing apparatus, and a video recording/reproducing apparatus. Hereinafter, an apparatus that performs gamma correction on a video signal S will be described as an example.

As illustrated in FIG. 1, the signal processing apparatus 1 includes an input terminal 11, a separation circuit 12, a gamma correction circuit 13, an output-to-input ratio calculation circuit 14, a color difference correction circuit 15, and an RGB conversion circuit 16.

The input terminal 11 supplies the separation circuit 12 with the input video signal S. The separation circuit 12 separates the video signal S into an input luminance signal Y and input color difference signals Cb (=B−Y) and Cr (=R−Y). The separation circuit 12 supplies the gamma correction circuit 13 and the output-to-input ratio calculation circuit 14 with the input luminance signal Y and supplies the color difference correction circuit 15 with the input color difference signals Cb and Cr.

The gamma correction circuit 13 performs gamma correction on the input luminance signal Y supplied from the separation circuit 12 using a characteristic curve for gamma correction. The gamma correction circuit 13 supplies the output-to-input ratio calculation circuit 14 and the RGB conversion circuit 16 with a gamma-corrected output luminance signal Y'.

The output-to-input ratio calculation circuit 14 calculates an output-to-input ratio p (=Y'/Y) representing a ratio of the output luminance signal Y' to the input luminance signal Y using a calculation table. The output-to-input ratio calculation circuit 14 supplies the color difference correction circuit 15 with the calculation result.

The color difference correction circuit 15 multiplies the input color difference signals Cb and Cr supplied from the separation circuit 12 by the output-to-input ratio p and corrects the input color difference signals Cb and Cr. The color difference correction circuit 15 supplies the RGB conversion circuit 16 with output color difference signals Cb' and Cr' obtained by color difference correction.

The RGB conversion circuit 16 receives the output luminance signal Y' and the output color difference signals Cb' and Cr' and converts the output luminance signal Y' and the output color difference signals Cb' and Cr' into color signals R, G, and B. The RGB conversion circuit 16 outputs the color signals R, G, and B to a display device (not shown) or a subsequent processing apparatus.

As the video signal S, the input luminance signal Y and the input color difference signals Cb and Cr may be separately input. In this case, the separation circuit 12 may be omitted. Further, as the signal-processed video signal S, the output luminance signal Y' and the output color difference signals Cb' and Cr' may be separately output. In this case, the RGB conversion circuit 16 may be omitted.

[2. Operation of Signal Processing Apparatus 1]

Next, the operation of the signal processing apparatus 1 will be described with reference to FIGS. 2 to 7.

Figure 2:
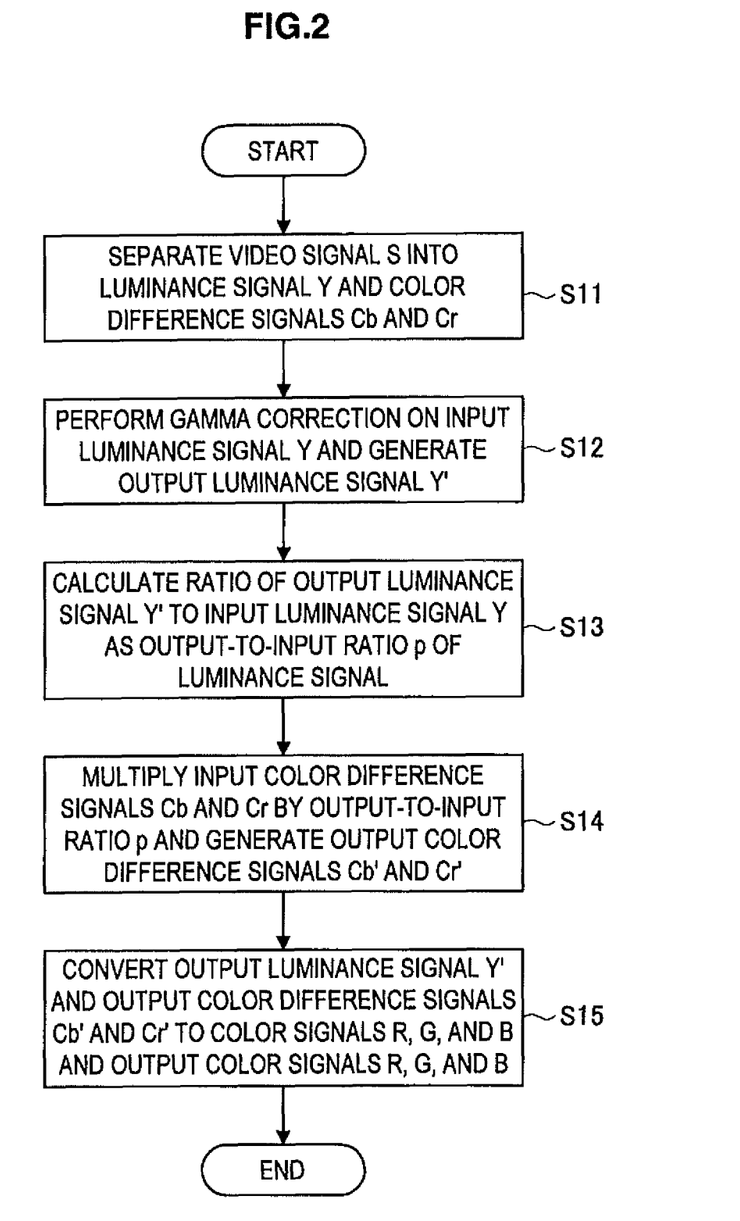
FIG. 2 is a flowchart illustrating an operation procedure of a signal processing apparatus.

First, the operation procedure of the signal processing apparatus 1 will be described. FIG. 2 illustrates the operation procedure of the signal processing apparatus 1. As illustrated in FIG. 2, in the signal processing apparatus 1, the separation circuit 12 first separates the video signal S into the input luminance signal Y and the input color difference signals Cb and Cr (step S11).

Next, the gamma correction circuit 13 performs gamma correction on the input luminance signal Y and generates the output luminance signal Y' (step S12). Then, the output-to-input ratio calculation circuit 14 calculates a ratio of the output luminance signal Y' to the input luminance signal Y as the output-to-input ratio p (=Y'/Y) of the luminance signal (step S13). The color difference correction circuit 15 multiplies the input color difference signals Cb and Cr by the output-to-input ratio p of the luminance signal and generates the output color difference signals Cb' and Cr' (step S14).

Further, the RGB conversion circuit 16 converts the output luminance signal Y' and the output color difference signals Cb' and Cr' into the color signals R, G, and B and outputs the color signals R, G, and B for the sake of a subsequent device or subsequent processing (step S15).

Figure 3:
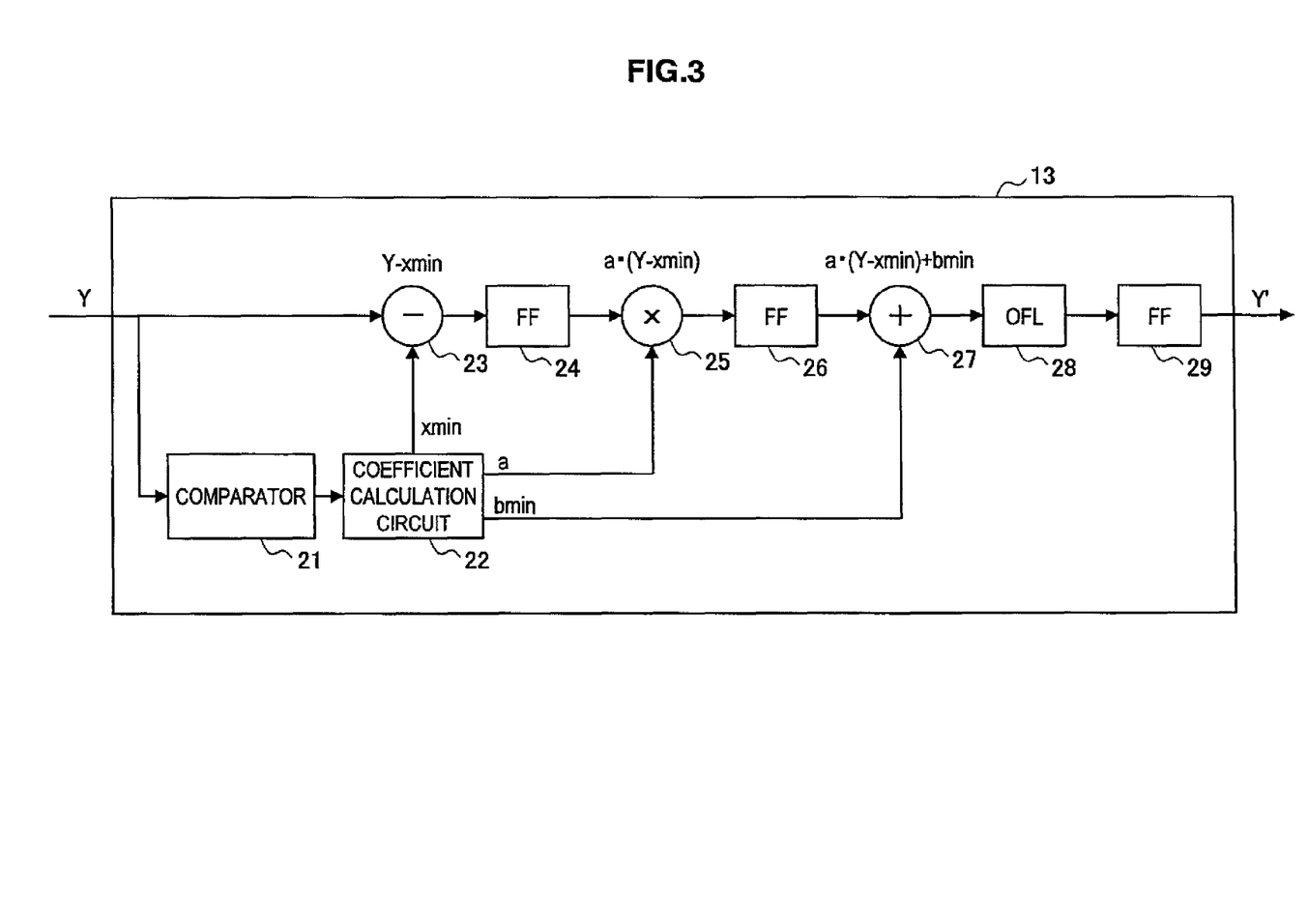
FIG. 3 is a block diagram illustrating a configuration of a gamma correction circuit.

Next, the operation of the gamma correction circuit 13 will be described. FIG. 3 illustrates the configuration of the gamma correction circuit 13, and FIG. 4 illustrates an example of a characteristic curve for gamma correction.

As illustrated in FIG. 3, the gamma correction circuit 13 includes a comparator 21, a coefficient calculation circuit 22, various calculators 23, 25, and 27, flip flops 24, 26, and 29, and an overflow limiter 28.

Figure 4:
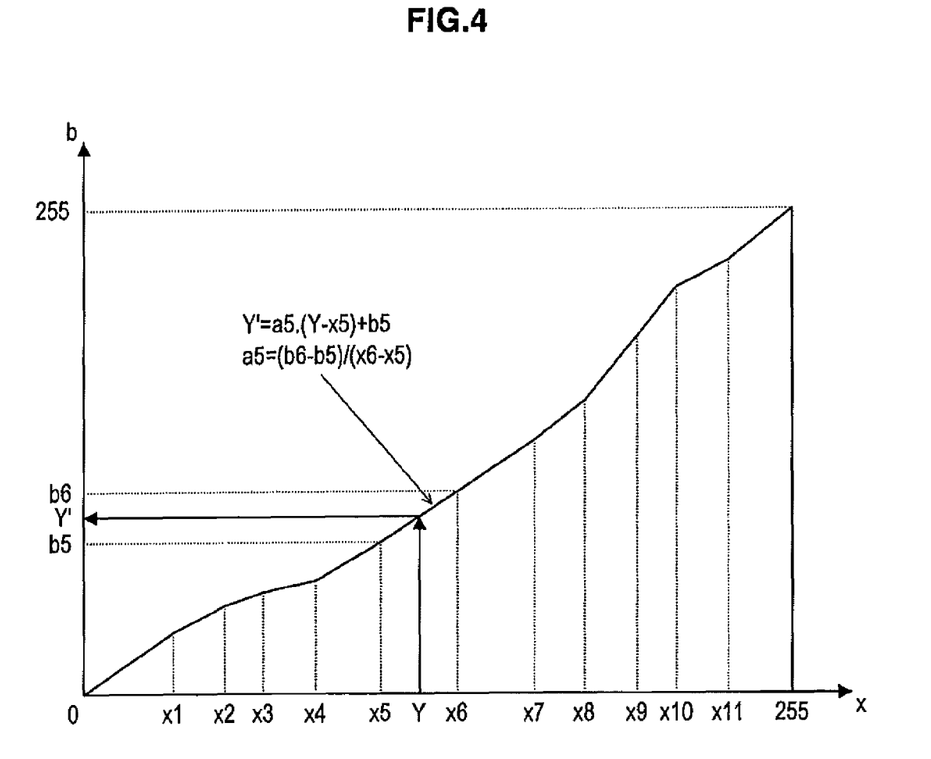
FIG. 4 is a view illustrating an example of a characteristic curve for gamma correction.

As illustrated in FIG. 4, a characteristic curve represents a relationship between an input value x (a horizontal axis) and an output value b (a vertical axis) of the luminance signal through a free curve. Both the input value x and the output value b of the luminance signal are represented by a value ranging from 0 to 225. In the characteristic curve, the characteristic curve is divided into a predetermined number of sections, and an input-output relationship in each section is linearly approximated.

As illustrated in FIG. 4, the characteristic curve is divided into 12 sections. The input value x is divided into sections of 0 to x1, x1 to x2, ..., and x11 to 255, and the output value b is divided into sections of 0 to b1, b1 to b2, ..., and b11 to 255 that correspond to the sections of the input value x. Each section of the input value x may be divided at an arbitrary width or a constant width.

The input luminance signal Y from the separation circuit 12 is supplied to the gamma correction circuit 13. The input luminance signal Y is supplied to the subtractor 23 and the comparator 21. In the comparator 21, a value of the input luminance signal Y (also referred to as an "input luminance value Y") is compared with the sections of the characteristic curve, and the section to which the input luminance value Y belongs is specified. A specifying result of the section is supplied to the coefficient calculation circuit 22.

In the coefficient calculation circuit 22, a minimum value xmin of the input value x in the specified section (for example, in the section of x5 to x6, xmin=x5) is obtained. Further, a gradient a of an approximate curve in the specified section and a minimum value bmin of the output value b in the specified section (for example, in the section of b5 to b6 corresponding to the section of x5 to x6, bmin=b5) are obtained.

The gradient a of the approximate curve is obtained as a ratio of a range of the output value b to a range of the input value x in the specified section (for example, a5=(b6−b5)/(x6−x5). The minimum input value xmin is supplied to the subtractor 23, the gradient a of the approximate curve is supplied to the multiplier 25, and the minimum output value bmin is supplied to the adder 27. The minimum input value xmin and the minimum output value bmin of each section and the gradient a of the approximate curve in each section are recorded in a memory (not shown) in the form of a table as coefficient calculation data.

In the subtractor 23, the minimum input value xmin is subtracted from the input luminance value Y, and the subtraction result (=Y−xmin) is supplied to the multiplier 25 through the flip flop 24. In the multiplier 25, the subtraction result is multiplied by the gradient a of the approximate curve, and the multiplying result (=a·(Y−xmin)) is supplied to the adder 27 through the flip flop 26.

In the adder 27, the minimum output value bmin is added to the multiplying result, and the addition result (=a·(Y−xmin)+bmin) is supplied to the output-to-input ratio calculation circuit 14 and the RGB conversion circuit 16 that are arranged behind the gamma correction circuit 13 through the overflow limiter 28 and the flip flop 29.

As a result, in the gamma correction circuit 13, the output luminance signal Y' obtained by performing gamma correction on the input luminance signal Y is generated using the characteristic curve specifying the input-output relationship of the luminance value Y. The output luminance signal Y' is linearly interpolated as in the following equation using FIG. 4:

$$Y'=a \cdot (Y-xmin)+bmin \quad (1)$$

For example, in the case of the input luminance signal Y (x5<Y≤x6), the section of x5 to x6 is specified in the characteristic curve, and the minimum input value xmin(=x5), the minimum output value bmin(=b5), and the gradient a5(=(b6−b5)/(x6−x5)) are calculated. Thus, the output luminance signal Y' is "a5·(Y−x5)+b5"

Since the coefficients xmin, bmin, and a used for calculation of the output luminance signal Y' are tabulated as coefficient calculation data, the output luminance signal Y' can be calculated without performing a division operation. Thus, a table for storing an enormous amount of reciprocal value data used for a division operation can be omitted, so that the circuit size can be reduced.

Figure 5:
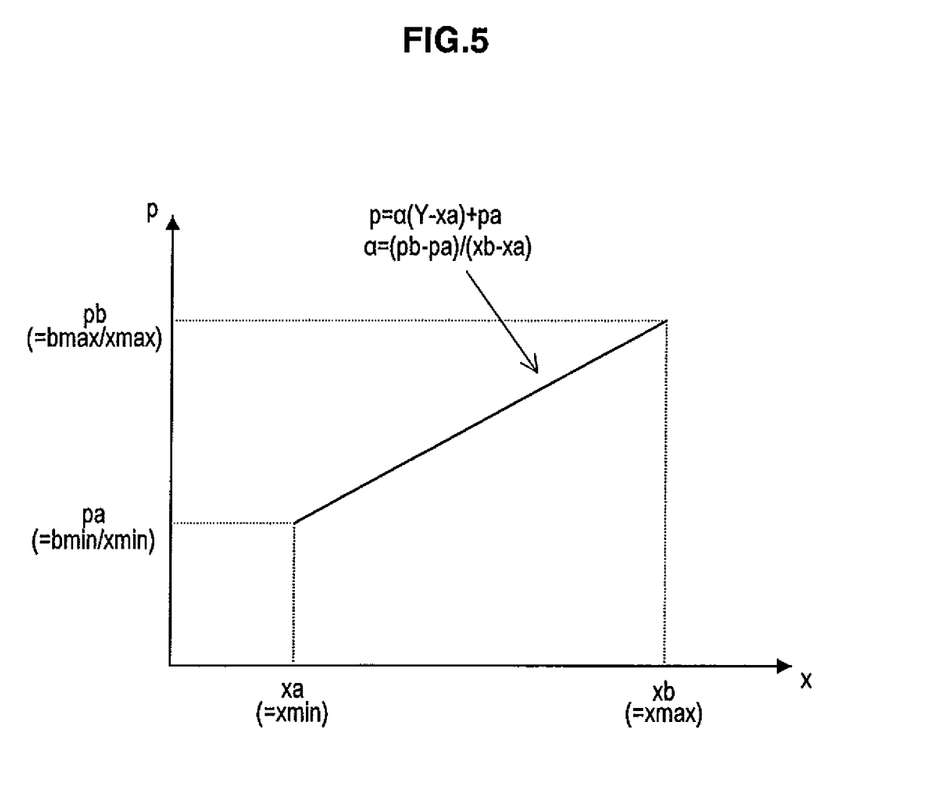
FIG. 5 is a view illustrating a method of calculating an output-to-input ratio.

Next, the operation of the output-to-input ratio calculation circuit 14 will be described. FIG. 5 illustrates a method of calculating the output-to-input p.

FIG. 5 illustrates a relationship between the input value Y of the luminance signal and the output-to-input ratio p (=Y'/Y) representing the ratio of the output value Y' to the input value Y of the luminance signal. A horizontal axis represents the input value x of the section to which the input luminance value Y belongs (see FIG. 4), and a vertical axis represents the output-to-input ratio p corresponding to the input value x of the horizontal axis.

Two input values xa and xb correspond to a minimum input value xmin and a maximum input value xmax (for example, in the section of x5 to x6, xmax=x6) in a section specified at the time of gamma correction. Two correction factors pa and pb correspond to a value pa obtained by dividing the minimum output value bmin of the approximate curve by the minimum input value xmin in the section specified at the time of gamma correction and a value pb obtained by dividing the maximum output value bmax (for example, in the section of b5 to b6 corresponding to the section of x5 to x6, bmax=b6) by the maximum input value xmax, respectively.

The input values xa and xb and the output-to-input ratios pa and pb corresponding to the input values xa and xb of each section and the gradient α(=(pb−pa)/(xb−xa)) of the output-to-input ratio p in each section are recorded in a memory (not shown) in the form of a table as output-to-input calculation data.

The output-to-input ratio p corresponding to the input luminance signal Y is linearly interpolated as in the following equation using FIG. 5:

$$p=\alpha(Y-xa)+pa \quad (2),$$

where α=(pb−pa)/(xb−xa)

For example, in the case of the above described input luminance signal Y (x5<Y≤x6), xa is x5, xb is x6, pa is b5/x5, and pb is b6/x6. Thus, the output-to-input ratio p corresponding to the input luminance signal Y is "(b6/x6−b5/x5)·(Y−x5)+b5/x5."

Since the coefficients xa, xb, pa, pb, and α used for calculation of the output-to-input ratio p are tabulated as output-to-input ratio calculation data, the output-to-input ratio p can be calculated without performing a division operation. Thus, a table for storing an enormous amount of reciprocal value data used for a division operation can be omitted, so that the circuit size can be reduced.

Next, the operation of the color difference correction circuit 15 will be described. In the color difference correction circuit 15, the input color difference signals Cb and Cr supplied from the separation circuit 12 are multiplied by the output-to-input ratio p supplied from the output-to-input ratio calculation circuit 14, so that the output color difference signals Cb' and Cr' are generated.

That is, the output color difference signals Cb' and Cr' are calculated as in the following equation:

$$Cb'=p \cdot Cb$$

$$Cr'=p \cdot Cr \quad (3)$$

As a result, by correcting the input color difference signals Cb and Cr using the output-to-input ratio p of the luminance signal, the output color difference signals Cb' and Cr' in which color difference correction has been performed in view of influence of gamma correction can be obtained. Thus, compared to when only the luminance signal is corrected, deterioration of an image can be further suppressed.

At this time, in a pixel having a large color difference, if the input color difference signals Cb and Cr are directly multiplied by the output-to-input ratio p, influence of color difference correction is very large, and thus the image may deteriorate. This is because in a pixel having a large color difference, a large luminance component is contained in the input color difference signals Cb and Cr, and so if the input color difference signals Cb and Cb are directly multiplied by the output-to-input ratio p, the luminance component is excessively corrected.

Figure 6:
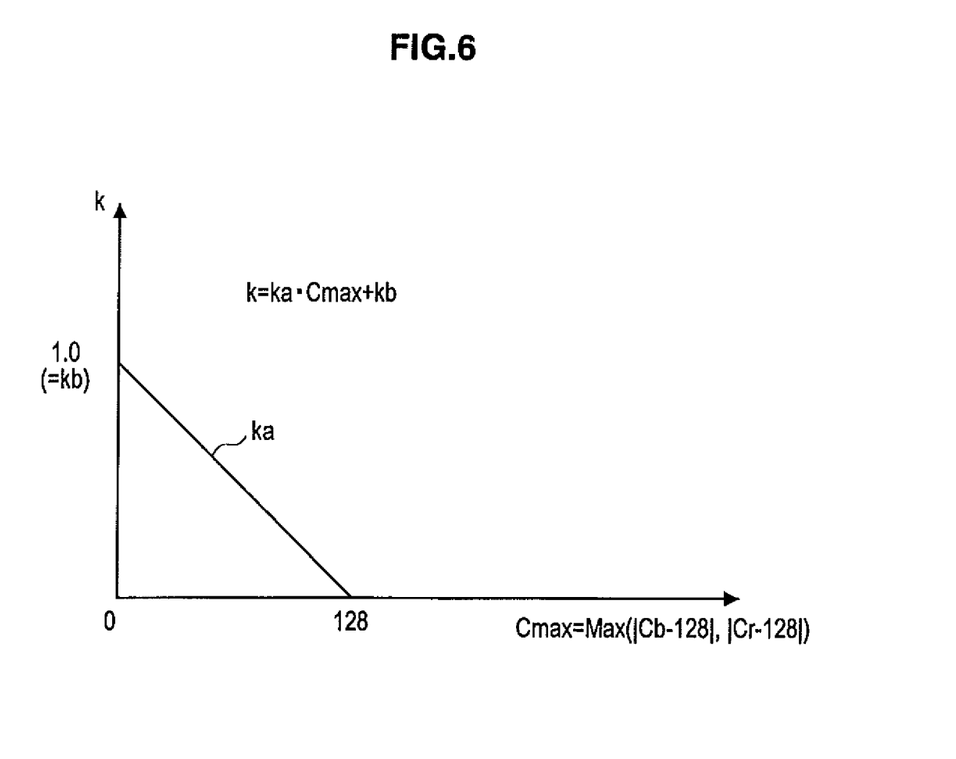
FIG. 6 is a view illustrating a method of revising an output-to-input ratio (½).
Figure 7:
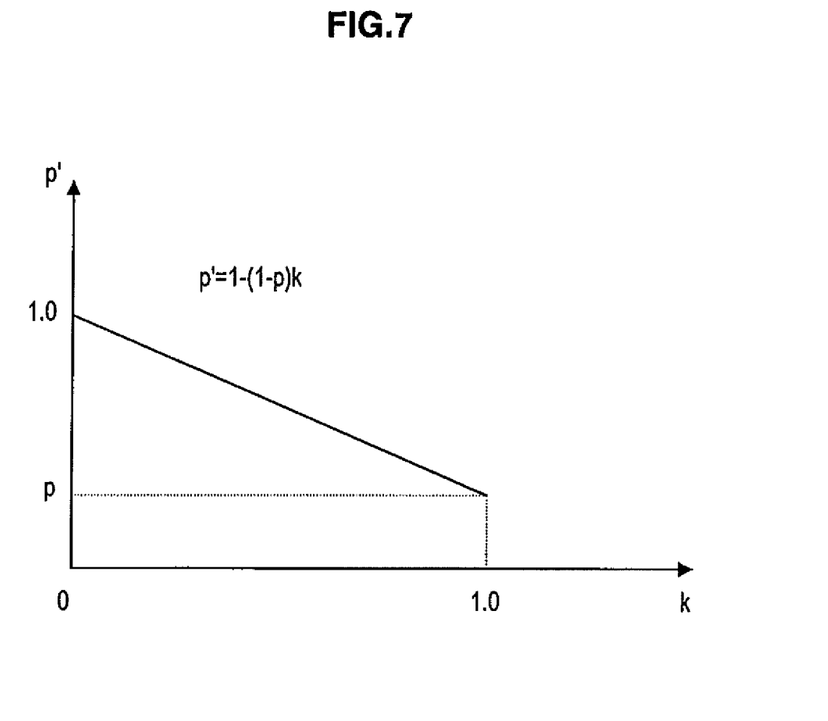
FIG. 7 is a view illustrating a method of revising an output-to-input ratio (2/2).

For this reason, as illustrated in FIGS. 6 and 7, the output color difference signals Cb' and Cr' may be generated by multiplying the input color difference signals Cb and Cr by an output-to-input ratio p' that is revised according to the values of the input color difference signals Cb and Cr. The revised output-to-input ratio p' is used in color difference correction but not used in gamma correction. FIGS. 6 and 7 illustrate a method of revising the output-to-input ratio p.

FIG. 6 illustrates a relationship between an input value Cmax of a color difference signal and a revision coefficient k for revising the output-to-input ratio p. A horizontal axis represents a value Cmax (=max(|Cb−128|, |Cr−128|) that makes an absolute value of a color difference maximum among the input values Cb and Cr of the color difference signal, and a vertical axis represents the revision coefficient k (0.0≤k≤1.0). The color difference is represented as a positive value or a negative value through a value, which ranges from −128 to +127, obtained by subtracting 128 from the input values Cb and Cr.

As illustrated in FIG. 6, the revision coefficient k is set to increase as the absolute value Cmax of the color difference decreases. The revision coefficient k is 1.0 when the absolute value Cmax of the color difference is zero (0) and is 0.0 when the absolute value Cmax of the color difference is 128 (or 127).

The relationship illustrated in FIG. 6 is represented as in the following equation:

$$k=ka \cdot Cmax+kb, \quad (4)$$

where ka is a gradient of a straight line in FIG. 6, kb is a maximum value (=1.0) of the revision coefficient k, and Cmax is "max(|Cb−128|, |Cr−128|)."

FIG. 7 illustrates a relationship between the revision coefficient k and the revised output-to-input ratio p'. A horizontal axis represents the revision coefficient k (0.0≤k≤1.0) obtained according to FIG. 6, and a vertical axis represents the output-to-input ratio p' (p≤p'≤1.0) revised by the revision coefficient k.

As illustrated in FIG. 7, as the revision coefficient k increases, the revised output-to-input ratio p' decreases. The revised output-to-input ratio p' is p when the absolute value Cmax of the color difference is zero (0) and is 1 when the absolute value Cmax of the color difference is 128 (or 127). The relationship illustrated in FIG. 7 is represented as in the following equation.

$$p' = 1 - (1-p) \cdot k \quad (5)$$

In the color difference correction circuit 15, the output color difference signals Cb' and Cr' are generated by multiplying the input color difference signals Cb and Cr supplied from the separation circuit 12 by the revised output-to-input ratio p'. That is, the output color difference signals Cb' and Cr' are calculated as in the following equations:

$$Cb' = p' \cdot Cb$$

$$Cr' = p' \cdot Cr \quad (6)$$

As a result, as the absolute value Cmax of the color difference decreases, influence of color difference correction on the output color difference signals Cb' and Cr' increases, whereas as the absolute value of the color difference increases, influence of color difference correction on the output color difference signals Cb' and Cr' decreases. Thus, in a pixel having a large color difference, correction of the color difference signals Cb and Cr is suppressed, and thus deterioration of an image caused by excessive correction can be suppressed.

An upper limit value or a lower limit value of the revision coefficient k may be adjusted so as to adjust influence of color difference correction. That is, in order to decrease influence of color difference correction, the upper limit value may be set to be small, and in order to increase influence of color difference correction, the lower limit value may be set to be large. The relationship between the input values Cb and Cr of the color difference signal and the revision coefficient k (the relationship illustrated in FIG. 6) may be defined by any other straight line or curve. Further, the relationship between the revision coefficient k and the revised output-to-input ratio p' (the relationship illustrated in FIG. 7) may be defined by any other relationship equation.

Figure 8:
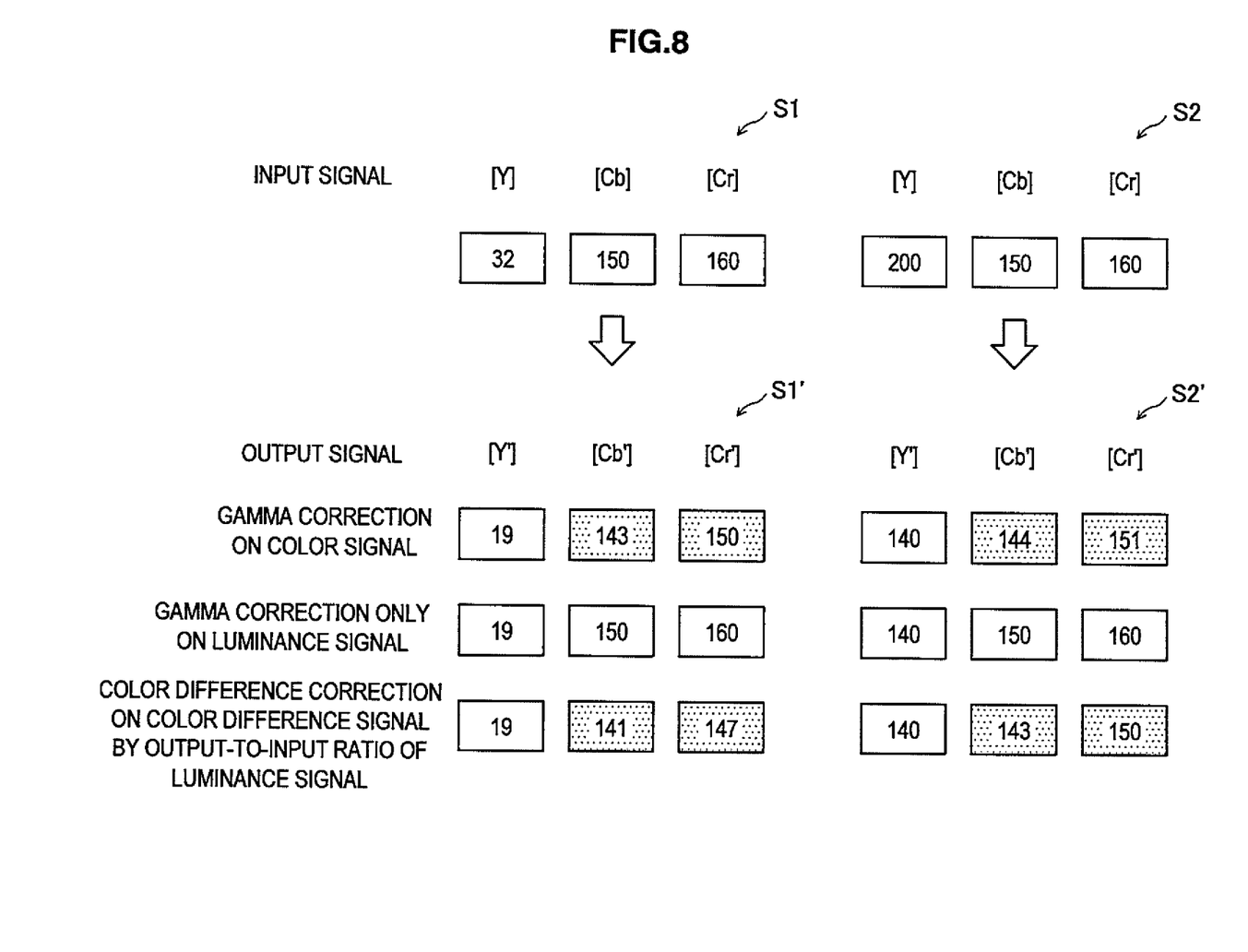
FIG. 8 is a view illustrating an example of a signal processing result.

FIG. 8 illustrates an example of a signal processing result by the signal processing apparatus 1. A description will be made below in connection with the case of performing signal processing on a first input signal S1 [Y, Cb, Cr] (=[32, 150, 160]) and a second input signal S2 [Y, Cb, Cr] (=[200, 150, 160]). To simplify the explanation, a value of a signal processing result is represented with values after the decimal point omitted.

When gamma correction is performed on the color signal (a first method), [19, 143, 150] is generated from the first input signal S1 as a first output signal S1' [Y', Cb', Cr'], and [140, 144, 151] is generated from the second input signal S2 as a second output signal S2' [Y', Cb', Cr'].

In the first method, the input signal [Y, Cb, Cr] is normalized, and the normalized input signal is converted into the color signal using a conversion equation that conforms to ITU-R BT. 709 Recommendation (Rec. 709). The converted color signal is subjected to gamma correction, and the gamma-corrected color signal is converted into the output signal [Y', Cb', Cr'].

Meanwhile, when gamma correction is performed only on the luminance signal (a second method), [19, 150, 160] is generated from the first input signal S1 as the first output signal S1' [Y', Cb', Cr'], and [140, 150, 160] is generated from the second input signal S2 as the second output signal S2' [Y', Cb', Cr'].

Meanwhile, when color difference correction is performed using the output-to-input ratio p (a third method), [19, 141, 147] is generated from the first input signal S1 as the first output signal S1' [Y', Cb', Cr'], and [140,143,150] is generated from the second input signal S2 as the second output signal S2' [Y', Cb', Cr'].

In the second and third methods, the color signal is not converted, and gamma correction is performed only on the luminance signal using the characteristic curve for gamma correction similar to the first method. In the third method, color difference correction is further performed on the color signals Cb and Cr using the output-to-input ratio p of the luminance signal.

The luminance value Y of the first output signal S1' is corrected from [32] to [19] in any of the methods. The color difference values Cb and Cr of the first output signals S1' are corrected from [150, 160] to [143, 150] in the first method, not corrected in the second method, and corrected to [141, 147] in the third method.

Similarly, the luminance value Y of the second output signal S2' is corrected from [200] to [140] in any of the methods. The color difference values Cb and Cr of the second output signals S2' are corrected from [150, 160] to [144, 151] in the first method, not corrected in the second method, and corrected to [143, 150] in the third method.

Thus, it is confirmed that by performing color difference correction using the output-to-input ratio p (the third method), the color difference values have been corrected to the color difference values Cb' and Cr' closer to when gamma correction is performed on the color signal (the first method) than when gamma correction is performed only on the luminance signal (the second method).

[4. Summary]

As described above, according to the signal processing apparatus 1 and the signal processing method according to the embodiments of the present disclosure, by correcting the input color difference signals Cb and Cr using the output-to-input ratio p (or the revised output-to-input ratio p') of the luminance signal, the output color difference signals Cb' and Cr' in which color difference correction has been performed in view of influence of gamma correction can be generated. Thus, compared to when only the luminance signal is corrected, deterioration of an image can be further suppressed.

The preferred embodiments of the present disclose have been described in detail with reference to the appended drawings, but the present disclose is not limited thereto. It should be understood by those skilled in the art that various modifications, combinations, sub-combinations and alterations may occur depending on design requirements and other factors insofar as they are within the scope of the appended claims or the equivalents thereof.

For example, the above description has been made in connection with the case of implementing the signal processing method according to the present disclosure using the hardware configuration including the gamma correction circuit 13, the output-to-input ratio calculation circuit 14, and the color difference correction circuit 15. However, the signal processing method according to the present disclosure may be implemented using a software configuration instead of the hardware configuration. In this case, the signal processing method may be implemented by a program executed on a processor such as a central processing unit (CPU) or a digital signal processor (DSP).

What is claimed is:

1. A signal processing apparatus, comprising:
   a gamma correction circuit that performs gamma correction on an input luminance signal and generates an output luminance signal;
   an output-to-input ratio calculation circuit that calculates a ratio of the output luminance signal to the input luminance signal as an output-to-input ratio of a luminance signal; and
   a color difference correction circuit that revises the output-to-input ratio of the luminance signal in accordance with a determination of an absolute value of a color difference maximum among first and second values of an input color difference signal, multiplies the input color difference signal by the revised output-to-input ratio of the luminance signal, and generates an output color difference signal.

2. The signal processing apparatus according to claim 1, wherein the output-to-input ratio of the luminance signal is revised so that influence of color difference correction increases as an absolute value of a color difference value represented by the input color difference signal decreases.

3. The signal processing apparatus according to claim 1, wherein the output-to-input ratio calculation circuit calculates the output-to-input ratio of the luminance signal, without performing a division operation, using a calculation table specifying a relationship between an input value of the luminance signal and a ratio of an output value to the input value of the luminance signal.

4. The signal processing apparatus according to claim 1, wherein the gamma correction circuit calculates an output value of the luminance signal, without performing a division operation, using a calculation table specifying a relationship between an input value of the luminance signal and a ratio of the output value of the luminance signal.

5. The signal processing apparatus according to claim 1, wherein the color difference correction circuit multiplies another input color difference signal by the revised output-to-input ratio of the luminance signal, and generates another output color difference signal.

6. The signal processing apparatus according to claim 5, further comprising an RGB conversion circuit for converting the output luminance signal, the output color difference signal, and the another output color difference signal into R, G, and B color signals.

7. A signal processing method, comprising:
   performing gamma correction on an input luminance signal and generating an output luminance signal;
   calculating a ratio of the output luminance signal to the input luminance signal as an output-to-input ratio of a luminance signal;
   revising the output-to-input ratio of the luminance signal in accordance with a determination of an absolute value of a color difference maximum among first and second values of an input color difference signal; and
   multiplying the input color difference signal by the revised output-to-input ratio of the luminance signal, and generating an output color difference signal.

8. A non-transitory computer-readable medium having recorded therein a computer program having instructions for causing a computer to execute a signal processing method, the method comprising:
   performing gamma correction on an input luminance signal and generating an output luminance signal;
   calculating a ratio of the output luminance signal to the input luminance signal as an output-to-input ratio of a luminance signal;
   revising the output-to-input ratio of the luminance signal in accordance with a determination of an absolute value of a color difference maximum among first and second values of an input color difference signal; and
   multiplying the input color difference signal by the revised output-to-input ratio of the luminance signal, and generating an output color difference signal.

* * * * *